(12) United States Patent
Kaneko et al.

(10) Patent No.: US 6,301,886 B1
(45) Date of Patent: Oct. 16, 2001

(54) HYDRAULIC PRESSURE GENERATING APPARATUS FOR VEHICLE

(75) Inventors: Chiseki Kaneko; Junichi Komiyama, both of Nagano (JP)

(73) Assignee: Nissin Kogyo Co., Ltd., Nagano-ken (JP)

( * ) Notice: Subject to any disclaimer, the term of this patent is extended or adjusted under 35 U.S.C. 154(b) by 0 days.

(21) Appl. No.: 09/495,933

(22) Filed: Feb. 2, 2000

(30) Foreign Application Priority Data

Feb. 10, 1999 (JP) .................................................... 11-33466

(51) Int. Cl.[7] .................................................... B60T 13/00
(52) U.S. Cl. .......................................... 60/547.1; 92/169.2
(58) Field of Search ........................ 60/547.1; 91/376 R; 92/169.2, 99, 169.1; 180/274

(56) References Cited

U.S. PATENT DOCUMENTS

| 3,826,175 | 7/1974 | Thiel et al. . |
| 4,246,755 | 1/1981 | Weiler . |
| 4,586,580 | 5/1986 | Spielmann et al. . |
| 4,823,553 | * 4/1989 | Reynolds ............................. 92/169.2 |
| 5,454,224 | 10/1995 | Castel et al. . |
| 5,634,337 | * 6/1997 | Gautier et al. .......................... 60/554 |
| 6,041,601 | * 3/2000 | Verbo et al. ......................... 60/547.1 |
| 6,055,883 | * 5/2000 | Kato ..................................... 180/274 |

FOREIGN PATENT DOCUMENTS

| 39 22 215 A1 | 1/1991 | (DE) . |
| 62-179870 | 11/1987 | (JP) . |
| WO 93/02901 | 2/1993 | (WO) . |

* cited by examiner

Primary Examiner—F. Daniel Lopez
(74) Attorney, Agent, or Firm—McGuireWoods, LLP

(57) ABSTRACT

A booster 4 and a hydraulic pressure master cylinder 5 are disposed so as to be inclined upward of a vehicle body by an angle θ with respect to a line L2 extending along the longitudinal direction of the vehicle body. The front surface plate 4c of the booster 4 is provided at the upper side of the vehicle body with the low strength portion 9. A first notched portion 10f is provided at the upper side of the reinforcement plate 10 so as to open at the outer peripheral edge thereof. The lower side of the reinforcement flange 10b of the reinforcement plate 10 is partially removed to form a second notched portion 10g. When external force is applied to the hydraulic pressure master cylinder 5 from the front direction of the vehicle body, the low strength portion 9 and the first and second notched portions 10f, 10g serve to easily incline the hydraulic pressure master cylinder 5 to the upper direction of the vehicle body.

22 Claims, 4 Drawing Sheets

HYDRAULIC PRESSURE GENERATING APPARATUS FOR VEHICLE

BACKGROUND OF THE INVENTION

1. Field of the Invention

The present invention relates to a hydraulic pressure generating apparatus for a vehicle composed of two actuators, that is, a booster and a hydraulic pressure master cylinder for operating a brake or a clutch of an automobile by hydraulic pressure. More particularly, the invention relates to a hydraulic pressure generating apparatus for a vehicle which is arranged to avoid the physical influence on a crew compartment to the utmost when external force such as collision load etc. is applied to the hydraulic pressure generating apparatus from the front portion of a vehicle body.

2. Description of the Related Art

The hydraulic pressure generating apparatus for a vehicle for operating a brake or a clutch of an automobile by hydraulic pressure is generally configured by combining two actuators of a booster and a hydraulic pressure master cylinder, as disclosed in Japanese Utility Model Unexamined Publication No. Sho. 62-179870.

Such a hydraulic pressure generating apparatus is arranged in a manner that the booster is protrusively provided at the engine room side surface of a dash panel which partitions between the engine room of the front side of the vehicle and a crew compartment continuing to the engine room, then the coupling flange of the hydraulic pressure master cylinder is joined to the front plate of the booster, then a reinforcement plate is overlaid on the inner side of the booster since the front plate of the booster is thin, and these members are combined by a plurality of coupling bolts. Accordingly, the booster and the hydraulic pressure master cylinder are arranged in series along the longitudinal direction of the vehicle. Thus, a pressing load applied to a pedal through the depressing operation of a driver is increased by the booster, then converted into the hydraulic pressure by the hydraulic pressure master cylinder and the hydraulic pressure is supplied to the brake or the clutch.

When external force such as collision load etc. is applied to the hydraulic pressure generating apparatus within the engine room from the front portion direction of a vehicle body, the hydraulic pressure master cylinder and the booster are protruded to the crew compartment side. In particular, when extremely large external force is applied to the hydraulic pressure generating apparatus, the push rods of the booster and the pedals or the like coupled thereto disposed within the crew compartment may abut against the legs etc. of a driver. Thus, it is preferable to incline the hydraulic pressure master cylinder to the vehicle body side or to incline the hydraulic pressure master cylinder integrally with the booster to the vehicle body side direction thereby to avert the external force.

However, in the aforesaid hydraulic pressure generating apparatus, the reinforcement plate combined with the front plate of the booster is configured in a manner that a reinforcement flange is provided at the outer periphery of a plate shaped portion so that the reinforcement flange increases the rigidity force of the reinforcement plate. Therefore, the hydraulic pressure generating apparatus has a large resistance against the external force applied from the front portion direction of the vehicle body and the reinforcement flange prevents the hydraulic pressure master cylinder from inclining to the vehicle body side direction.

SUMMARY OF THE INVENTION

Accordingly, an object of the present invention is to provide a hydraulic pressure generating apparatus for a vehicle which can prevent to the utmost push rods and pedals or the like disposed within a crew compartment from being moved to a driver side when external force is applied to the hydraulic pressure generating apparatus within an engine room from the front portion direction of a vehicle body, and which does not require any change of the arrangement of a hydraulic pressure master cylinder nor a booster and the configuration for attaching the cylinder and the booster to the vehicle body.

In order to attain the aforesaid object, there is provided a hydraulic pressure generating apparatus for a vehicle wherein a booster for increasing a pedal depressing force is protrusively provided at an engine room side surface of a dash panel which partitions between the engine room of a front side of the vehicle and a crew compartment continuing to the engine room, a hydraulic pressure master cylinder which receives the pedal depressing force increased by the booster to operate a brake and a clutch by hydraulic pressure is coupled to a front portion of the booster. A front surface plate of a booster shell of the booster is coupled with a coupling flange of the hydraulic pressure master cylinder. A reinforcement plate provided with a reinforcement flange at an outer periphery of a plate shaped portion is joined to an inside of the front surface plate of the booster shell. The booster and the hydraulic pressure master cylinder are disposed so as to be integrally inclined to a side direction of the vehicle body from a longitudinal direction of the vehicle body, and the reinforcement flange of the reinforcement plate is removed at a side thereof opposite to a side toward which the booster and the hydraulic pressure master cylinder are inclined.

The reinforcement plate may be removed at least in the reinforcement flange at a side thereof toward which the booster and the hydraulic pressure master cylinder are inclined. Further, the front surface plate of the booster shell may be provided with a low strength portion, at the side toward which the booster and the hydraulic pressure master cylinder are inclined, which is broken due to an abutment of the coupling flange thereto when the booster and the hydraulic pressure master cylinder are inclined to a direction to be inclined by external force applied thereto from a front direction of the vehicle body.

DETAILED DESCRIPTION OF THE PREFERRED EMBODIMENTS

The embodiment of the present invention will be explained with reference to the accompanying drawings.

Figure 1:
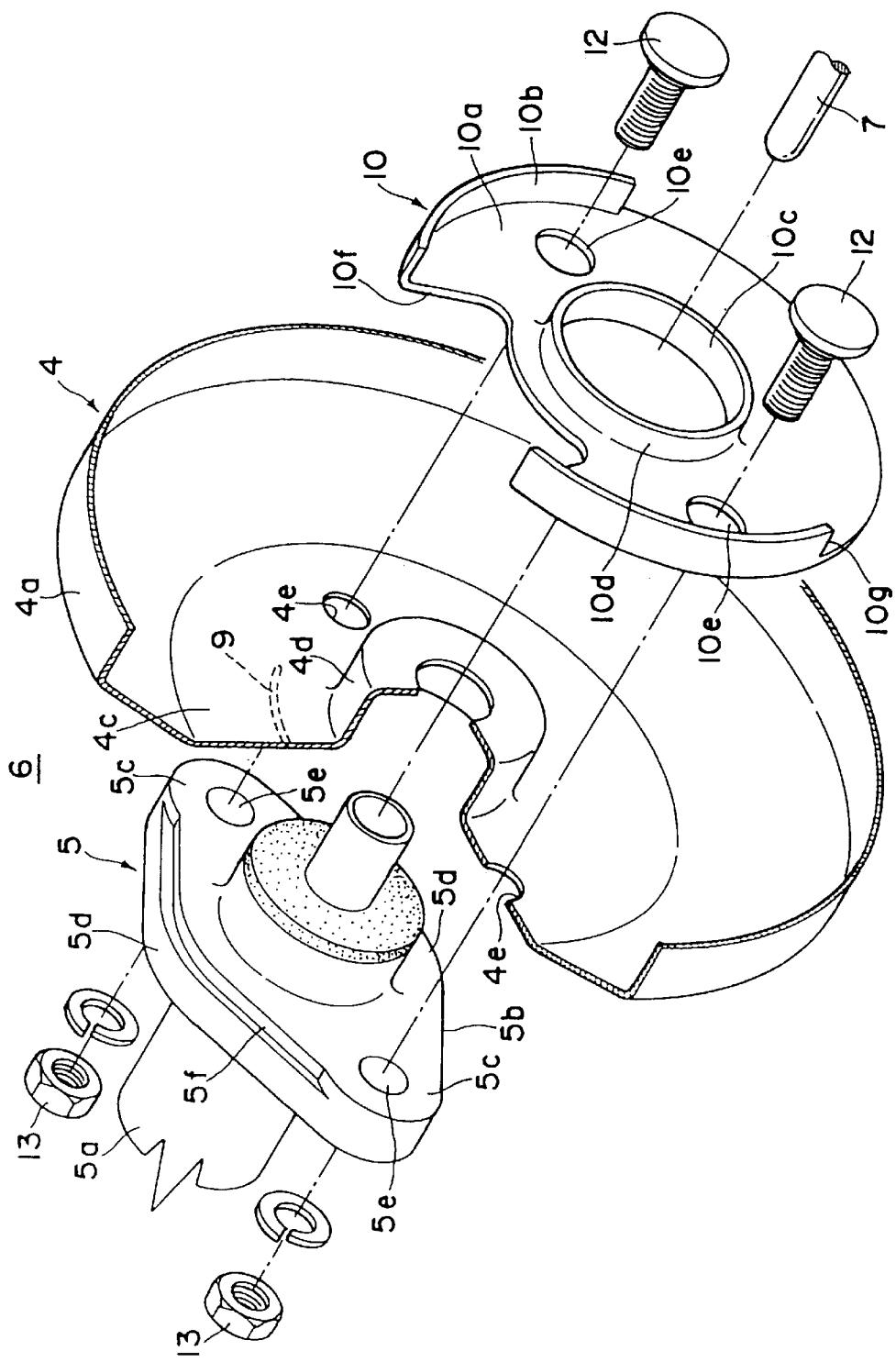
FIG. 1 is an exploded perspective view of a booster and a hydraulic pressure master cylinder according to an embodiment of the present invention.
Figure 2:
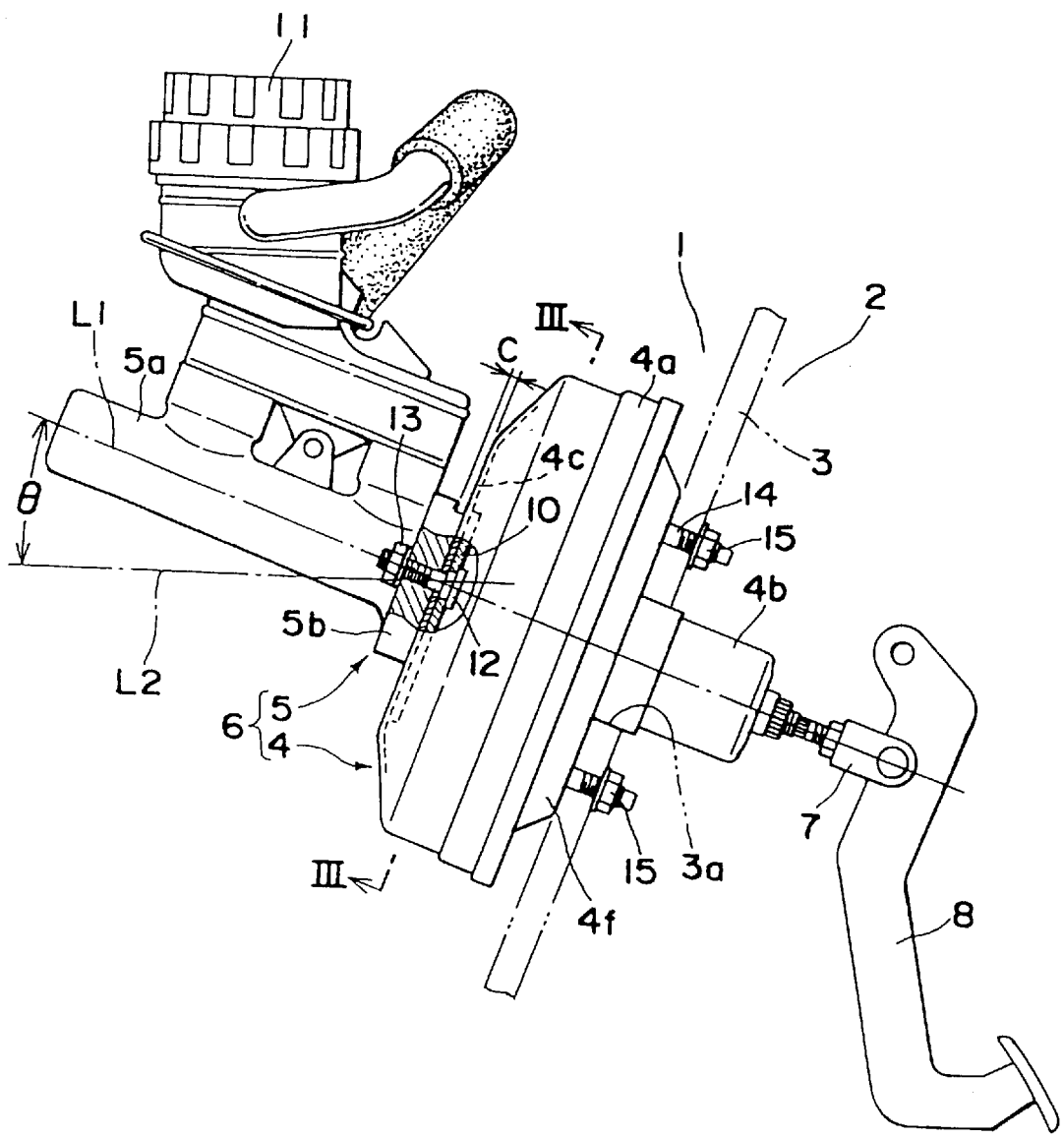
FIG. 2 is a front view showing the attached state of a hydraulic pressure generating apparatus according to the embodiment of the present invention.
Figure 3:
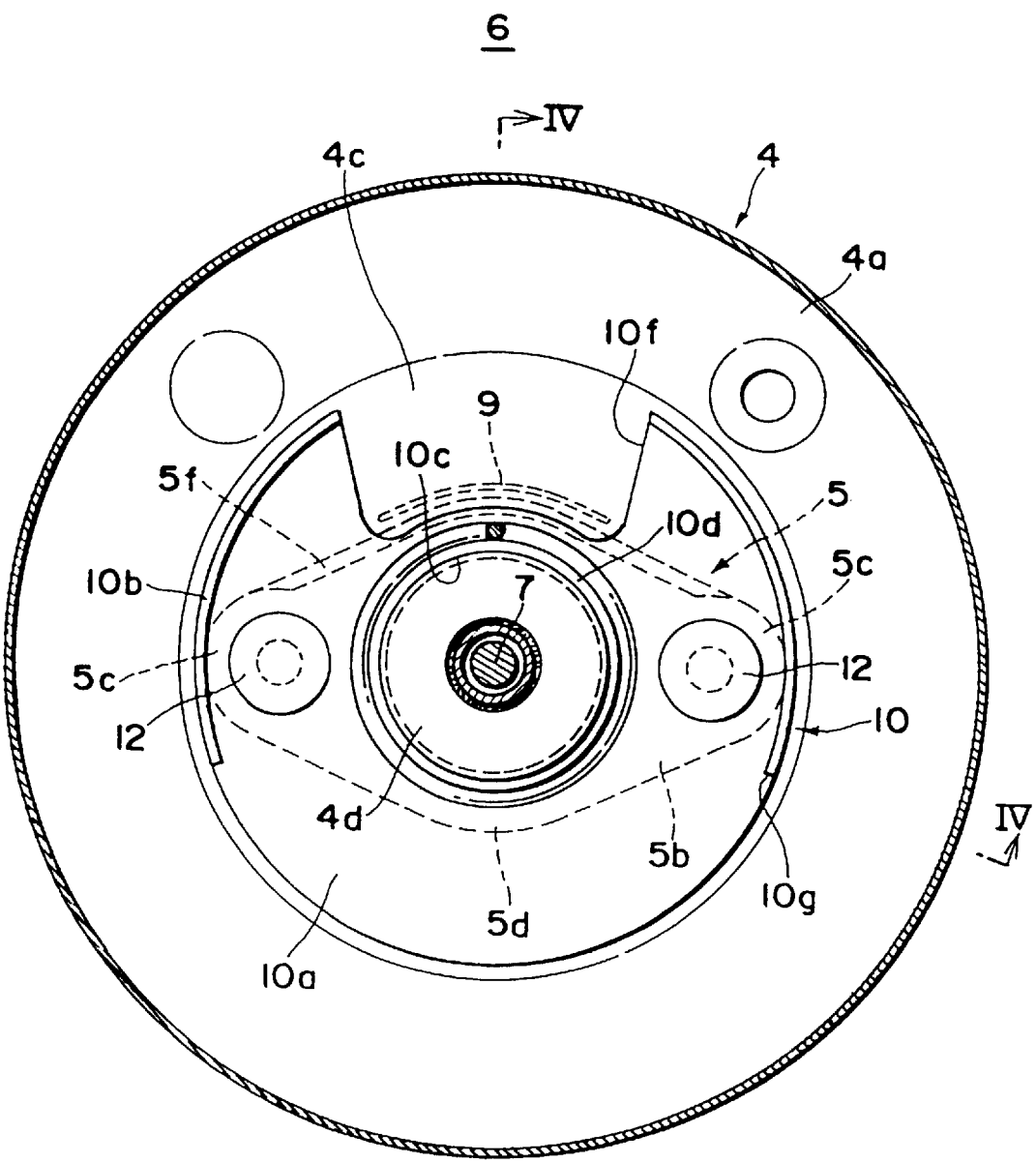
FIG. 3 is a sectional view taken along a line III—III in FIG. 2.
Figure 4:
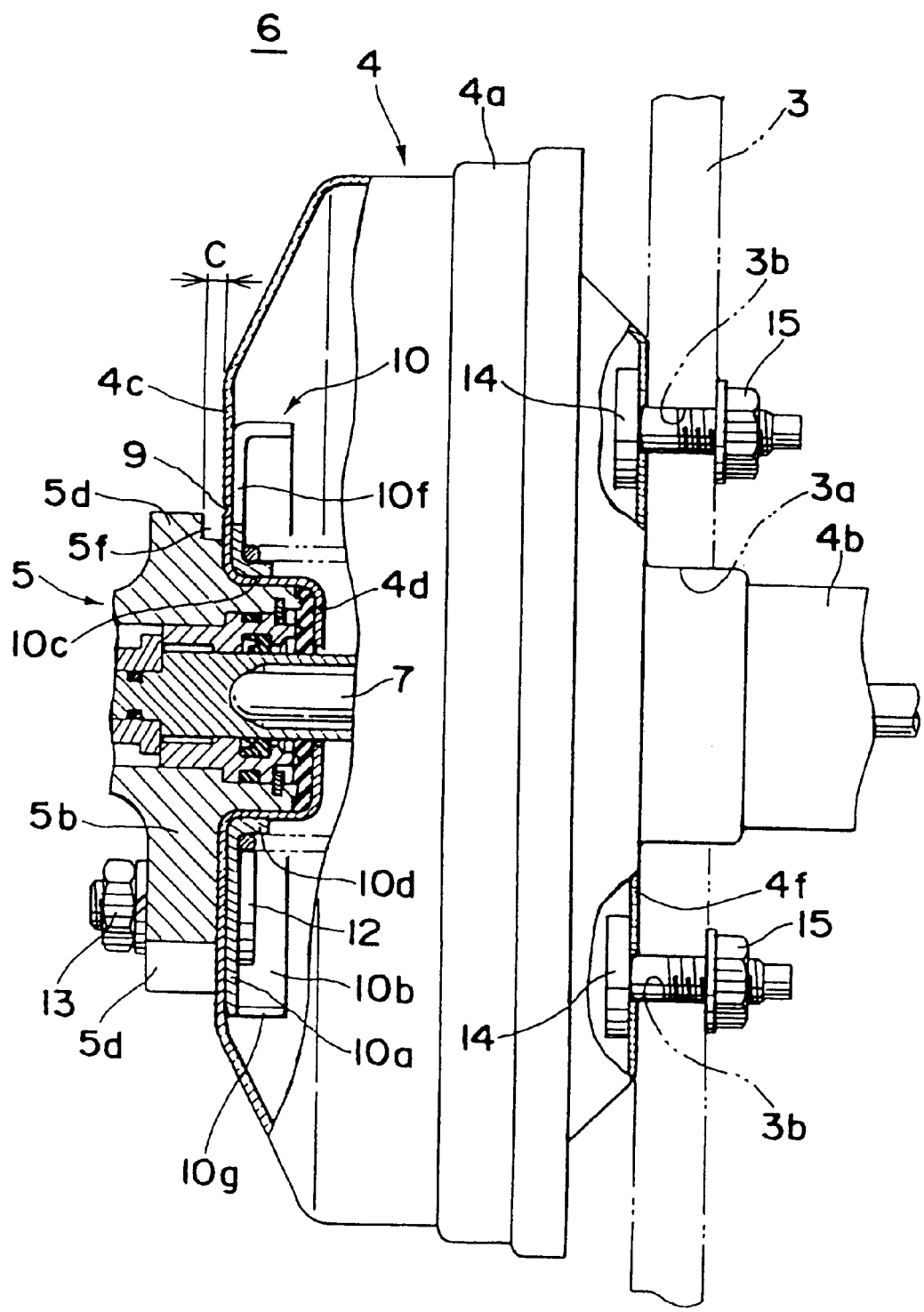
FIG. 4 is a sectional view taken along a line IV—IV in FIG. 3.

An engine room 1 at the front portion side of a vehicle body (the left side in FIG. 2) and a crew compartment 2 continuous to the engine room 1 are partitioned by a dash panel 3. A hydraulic pressure generating apparatus 6, which is formed by coupling two hydraulic pressure generating actuators, that is, a negative pressure type booster 4 and a hydraulic pressure master cylinder 5 in series, is protrusively provided at the engine room side surface of the dash panel 3 within the engine room 1. The valve housing 4b of the booster 4, a push rod 7 and a pedal 8 are disposed within the crew compartment 2. A pedal depressing force applied to the pedal 8 is increased by the booster 4. The hydraulic pressure master cylinder 5 generates a hydraulic pressure necessary for operating a brake and a clutch by the pedal depressing force thus increased by the booster 4.

The dash panel 3 is disposed so as to oppose to the longitudinal direction of the vehicle body (transverse direction in FIG. 2) and to be slightly inclined at its upper portion to the crew compartment 2 side. The booster 4 is formed by a booster shell 4a with a large diameter, a cylindrical valve housing 4b with a small diameter continuing to the booster shell 4a, and the push rod 7 protruding from the rear end of the valve housing 4b. The front surface plate 4c of the booster shell 4a serving as the coupling side to the hydraulic pressure master cylinder 5 is provided at its center portion with a fitting portion 4d with a small diameter which caves within the booster shell 4a. The fitting portion 4d is provided at its both sides with bolt insertion holes 4e, 4e. A low strength portion 9 is provided at the upper side of the fitting portion 4d which is perpendicular to the both bolt insertion holes 4e, 4e, and a reinforcement plate 10 is joined to the inner side of the front surface plate 4c.

As the hydraulic pressure master cylinder 5, a reservoir-integrationtype is employed in which a reservoir 11 is directly coupled to the upper portion of a cylinder body 5a. A plate-like diamond-shaped coupling flange 5b is integrally provided at the rear portion side of the cylinder body 5a. The coupling flange 5b is formed in an elongated diamond shape to have arc-shaped tip portions 5c, 5c with an acute angle at the left and right ends thereof and arc-shaped tip portions 5d, 5d with an obtuse angle at the upper and lower ends thereof. The left and right arc-shaped tip portions 5c, 5c are provided with bolt insertion holes 5e, 5e, respectively. A recessed portion 5f is formed at the outer surface of one of the tip portions 5d with an obtuse angle which is perpendicular to the bolt insertion holes 5e, 5e.

The low strength portion 9 is formed by a notched groove with a V-shaped section provided at the outer surface of the front surface plate 4c of the booster shell 4a. The notched groove is disposed at the slightly outer side of the outer edge of the tip end side of the arc-shaped tip portion 5d with an obtuse angle of the coupling flange 5b of the hydraulic pressure master cylinder 5 so as to have the similar shape as the arc-shaped tip portion 5d with an obtuse angle.

When the hydraulic pressure master cylinder 5 is applied with external force from the front portion direction of the vehicle body and the arc-shaped tip portion 5d of the coupling flange 5b abuts against the front surface plate 4c of the booster shell 4a, it is arranged that the arc-shaped tip portion 5d of the coupling flange 5b can easily break the notched groove with a low strength forming the low strength portion 9. The low strength portion 9 may be formed, instead of forming the aforesaid notched groove, by stamping product lot number and product name etc. on the front surface plate so as to have a thin thickness. Alternatively, the low strength portion 9 may be formed by an intermittently cut line such as perforations so long as the negative pressure within the booster shell 4a can be held.

The reinforcement plate 10 is formed so as to improve the rigidity of the front surface plate 4c, taking into consideration that the booster shell 4a is formed by bending a metal thin plate, the negative pressure within the booster shell 4a becomes high, and the hydraulic pressure master cylinder 5 is coupled to the front surface plate 4c. The reinforcement plate is formed in a manner that the entirety of both a circular plate shaped portion 10a and a reinforcement flange 10b bent to the one side direction from the outer peripheral edge of the plate shaped portion 10a is formed by a metal plate thicker than the booster shell 4a.

The plate shaped portion 10a is provided at its center portion with an insertion hole 10c having a diameter larger than that of the fitting portion 4d of the booster 4 within the flange 10d. The plate shaped portion 10a is further provided with bolt insertion holes 10e, 10e at both side portions of the plate shaped portion 10a which are opposed through the insertion hole 10c. A first notched portion 10f of substantially fan-shape, which is formed by partially removing the plate shaped portion 10a and the reinforcement flange 10b, is provided at the one side portion of the reinforcement plate 10 perpendicular to the bolt insertion holes 10e, 10e so as to open at the outer peripheral edge of the reinforcement plate 10. At the other end side portion of the reinforcement plate 10 opposing to the first notched portion 10f, only the reinforcement flange 10b is removed in its almost semicircular potion to form a second notched portion 10g.

As described later, the first notched portion 10f is arranged in such a manner that, when the booster 4 and the hydraulic pressure master cylinder 5 are coupled together with the reinforcement plate 10, the first notched portion 10f is positioned in adjacent to the low strength portion 9 at the inner side of the front surface plate 4c of the booster 4. Further, the first notched portion 10f is arranged in such a manner that the coupling flange 5b of the hydraulic pressure master cylinder 5 which broke through the low strength portion 9 can easily enter into the booster 4, when the hydraulic pressure master cylinder 5 is inclined to the front surface plate 4c direction of the booster 4 by the external force applied from the front portion direction of the vehicle body. Further, since the reinforcement flange 10b is removed by an amount corresponding to the second notched portion 10g at the other end side portion of the reinforcement plate 10 opposing to the one side portion thereof (the first notched portion 10f side), the rigidity force of the one side portion side of the reinforcement plate 10 is reduced and so the resistance with respect to the external force acting on the one side portion side of the reinforcement plate 10 is reduced. Thus, the front portion of the booster 4 can be easily broken or crashed to easily incline the hydraulic pressure master cylinder 5.

The fitting portion 4d of the booster shell 4a is passed through the insertion hole 10c at the center portion of the reinforcement plate 10. Then, the reinforcement plate 10 is overlaid on the inner surface of the front surface plate 4c while aligning the bolt insertion holes 10e, 10e with the bolt insertion holes 4e, 4e. Further, coupling bolts 12 are inserted into the combination of the bolt insertion holes 4e, 10e from the reinforcement plate 10 side thereby to retain the base portions of the coupling bolts 12 in the outer surface of the front surface plate 4c of the booster shell 4a. Thus, the shell 4, the reinforcement plate 10 and the coupling bolts 12, 12 are provisionally assembled in advance.

In the hydraulic pressure master cylinder 5, the coupling bolts 12, 12 protruding from the front surface plate 4c of the booster shell 4a are inserted into the bolt insertion holes 5e, 5e of the coupling flange 5b while the recessed portion 5f at the one of the arc-shaped tip portions 5d with an obtuse angle of the coupling flange 5b is directed to the same side as the first notched portion 10f of the reinforcement plate 10. Thus, the rear end portion of the cylinder body 5a is housed within the fitting portion 4d of the booster shell 4a and simultaneously the coupling flange 5b is overlaid on the front surface plate 4c of the booster shell 4a. Then, nuts 13 are screwed at the tip end sides of the coupling bolts 12, 12 thereby to couple the hydraulic pressure master cylinder 5 and the booster 4 in series. In this manner, the booster 4 and the hydraulic pressure master cylinder 5 constitute the hydraulic pressure generating apparatus 6.

According to this coupling, the low strength portion 9 of the front surface plate 4c of the booster 4, the arc-shaped tip portion 5d of the coupling flange 5b of the hydraulic pressure master cylinder 5 and the first notched portion 10f of the reinforcement plate 10 are overlaid on the same side. Further, since the recessed portion 5f is provided at the outer surface of this arc-shaped tip portion 5d, a clearance C is set between the arc-shaped tip portion 5d of the coupling flange 5b and the front surface plate 4c of the booster shell 4a.

The booster 4 and the hydraulic pressure master cylinder 5 thus coupled as the hydraulic pressure generating apparatus 6 is protrusively provided at the engine room side of the dash panel 3 in the following manner. That is, the low strength portion 9 of the front surface plate 4c of the booster shell 4a and the first notched portion 10f of the reinforcement plate 10 are directed to the upper side of the vehicle body, and the two coupling bolts 12, 12 are directed to the transversal direction of the vehicle body and further the second notched portion 10g of the reinforcement plate 10 is directed to the lower side of the vehicle body. In this state, the valve housing 4b of the booster 4 is passed into the insertion hole 3a of the dash panel 3 from the engine room 1 side, then the rear surface plate 4f of the booster shell 4a is made abut against the engine room side surface of the dash panel 3. Further, a plurality of attachment bolts 14 protrusively provided at the rear surface plate 4f are passed through the bolt holes 3b of the dash panel 3 to protrude the bolts into the crew compartment 2, and nuts 15 are screwed at the tip ends of the attachment bolts 14.

The dash panel 3 is disposed so that its upper portion is slightly inclined backward toward the crew compartment 2 side as described above. Accordingly, the booster 4 and the hydraulic pressure master cylinder 5 of the hydraulic pressure generating apparatus 6 are disposed in a manner that the center axis L1 of the booster shell 4a and the cylinder body 5a is inclined upward by an angle θ with respect to a line L2 extending along the longitudinal direction of the vehicle body between the coupling bolts 12, 12 positioned at the left and right positions along the transversal direction of the vehicle body. Further, the low strength portion 9 of the front surface plate 4c of the booster shell 4a, the first notched portion 10f of the reinforcement plate 10 and the clearance C are positioned at the upper portion side of the vehicle body which is at the inclined side of the booster 4 and the hydraulic pressure master cylinder 5.

In this manner, according to the embodiment, the booster 4 and the hydraulic pressure master cylinder 5 of the hydraulic pressure generating apparatus 6 disposed within the engine room 1 are disposed so as to be inclined upward by the angle θ with respect to the line L2 extending along the longitudinal direction of the vehicle body, and the two coupling bolts 12, 12 for coupling the coupling flange 5b of the cylinder body 5a with the front surface plate 4c of the booster 4 are disposed at the left and right positions along the transversal direction of the vehicle body. Further, the low strength portion 9 of the front surface plate 4c of the booster shell 4a and the first notched portion 10f of the reinforcement plate 10 are disposed so as to be inclined upward by the angle θ to the upper portion side of the vehicle body which is at the inclined side of the booster 4 and the hydraulic pressure master cylinder 5.

According to such an configuration, when the tip end side of the hydraulic pressure master cylinder 5 located at the front portion side of the vehicle body is applied with external force such as collision load etc. from the front direction of the vehicle body, the external force is applied on the hydraulic pressure master cylinder 5 to the upward direction crossing with the coupling bolts 12, 12 disposed at the left and right positions along the transversal direction of the vehicle body and acts so as to lay the entirety of the cylinder body 5a including the coupling flange 5a upward.

At the lower side of the hydraulic pressure generating apparatus 6 in opposite to the upper side of the hydraulic pressure master cylinder 5 on which the external force acts from the front direction of the vehicle body, the reinforcement flange 10b is removed by the amount corresponding to the second notched portion 10g to reduce the rigidity force. And, the resistance with respect to the external force acting on the one side portion side of the reinforcement plate 10 is also reduced. Accordingly, the front portion of the booster 4 can be easily broken or crashed to easily incline the hydraulic pressure mastercylinder 5. Thus, the arc-shaped tip portion 5d positioned at the upper portion side of the coupling flange 5b inclines towards the front surface plate 4c made of the metal thin plate while decreasing the clearance C, then breaks the low strength portion 9 positioned slightly outer side from the arc-shaped tip portion 5d and breaks through the front surface plate 4c, and further enters into the first notched portion 10f of the reinforcement plate 10 positioned at the inner side of the front surface plate thereby to incline upward the entirety of the hydraulic pressure master cylinder 5.

In addition, the reinforcement plate 10 is constructed so as to be bendable in vicinity of lower ends of the reinforcement flanges 10b where the second notched portion 10g is removed, when the force of a predetermined value or more is applied to the reinforcement plate 10 by the tilting of the hydraulic pressure master cylinder 5.

Such an inclination of the hydraulic pressure master cylinder 5 acts on the succeeding booster 4 as an upward offset load, so that the booster 4 is applied with angular moment in which the portion near the attachment portion to the dash panel 3 acts as a fulcrum. Thus, since the valve housing 4b, the push rod 7 and the pedal 8 within the crew compartment 2 continuing to the booster 4 are shunted to the lower direction of the vehicle body of the dash panel 3, these members can be prevented satisfactorily from being moved to a driver side.

Further, in the embodiment, the booster 4 and the hydraulic pressure master cylinder 5 of the hydraulic pressure generating apparatus 6 are inclined upward by the angle θ with respect to the line L2 extending along the longitudinal direction of the vehicle body, and the low strength portion 9 of the front surface plate 4c and the first notched portion 10f of the reinforcement plate 10 are positioned at the upper portion side of the vehicle body which is the inclined side of the booster 4 and the hydraulic pressure master cylinder 5. Accordingly, not only in the case where the external force from the front portion direction of a vehicle body acts on the line L2 extending along the longitudinal direction of the vehicle body but also in the case where the external force acts on the hydraulic pressure master cylinder 5 as an offset load strayed off the line L2, the valve housing 4b, the push rod 7 and the pedal 8 can be prevented surely from being moved to a driver side.

Further, with respect to the clearance C set between the arc-shaped tip portion 5d positioned at the upper portion side of the coupling flange 5b and the front surface plate 4c of the booster shell 4a, at the initial period of the inclining operation where the arc-shaped tip portion 5d of the hydraulic pressure master cylinder 5 starts inclining toward the front surface plate 4c, the arc-shaped tip portion 5d is buried in the clearance C and so the master cylinder 5 is not applied with the resistance of the front surface plate until the arc-shaped tip portion 5d abuts against the front surface plate 4c. Thus, the hydraulic pressure master cylinder 5 can be inclined easily toward the upper portion of the vehicle body and further the breakage of the front surface plate 4c due to the arc-shaped tip portion 5d can be easily and surely performed.

The hydraulic pressure generating apparatus according to the invention can attain the desired object when the booster and the master cylinder are inclined to the direction other than the upper portion of the vehicle body shown in the embodiment, that is, the transversal direction of the vehicle body, the lower direction of the vehicle body or any direction other than these direction. The reinforcement flange of the reinforcement plate, which is removed at the side thereof opposite to the inclined side of the booster and the hydraulic pressure master cylinder, may be suitably decided in its size and shape in view of the configuration of the hydraulic pressure generating apparatus and the external force and not limited to the aforesaid embodiment.

In addition to the aforesaid arrangement, as means for assisting the inclination of the hydraulic pressure master cylinder, such an arrangement may be employed that the reinforcement flange of the reinforcement plate is only removed at the side thereof opposite to the inclined side of the booster and the hydraulic pressure master cylinder. Alternatively, such an arrangement may be combined with the following arrangement that only the reinforcement flange of the reinforcement plate is removed or it is removed together with the plate shaped portion at the inclined side of the booster and the hydraulic pressure master cylinder, or a low strength portion is provided at the front surface plate of the booster shell at the side where the booster and the hydraulic pressure master cylinder are inclined.

When the clearance is provided between the projection piece of the coupling flange and the front surface plate of the booster shell as shown in the embodiment, at the initial period of the inclining operation of the coupling flange, the coupling flange and the projection piece can be easily inclined toward the front surface plate without being offered resistance from the front surface plate. However, the invention can incline the hydraulic pressure master cylinder even when there is not such a clearance.

While only certain embodiments of the invention have been specifically described herein, it will apparent that numerous modifications may be made thereto without departing from the spirit and scope of the invention.

As described above, according to the hydraulic pressure generating apparatus for a vehicle of the invention, since the reinforcement flange of the reinforcement plate is removed at the side thereof opposite to the inclined side of the booster and the hydraulic pressure master cylinder to reduce the rigidity force, the resistance with respect to the external force applied from the front direction of the vehicle body can be suppressed. Thus, the hydraulic pressure master cylinder can be easily inclined to the direction to be inclined, and so the push rods and the pedals or the like disposed within the crew compartment can be prevented from being moved to the driver side to the utmost. Further, since the configuration of the hydraulic pressure master cylinder and the booster and the coupling configuration thereof may be same as the conventional ones, the productivity of the apparatus is excellent and the apparatus can be carried out at a low cost. Furthermore, since the attachment structure to the vehicle body does not need any change, the apparatus is quite economy and used widely.

In addition to the aforesaid configuration, when the reinforcement flange of the reinforcement plate and the plate shaped portion are removed and the low strength portion is provided at the front surface plate of the booster shell at the side where the booster and the hydraulic pressure master cylinder are inclined, the hydraulic pressure master cylinder can be inclined more easily, so that the push rods and the pedals or the like can be more surely prevented from being moved to the driver side.

What is claimed is:

1. A hydraulic pressure generating apparatus for a vehicle, comprising:
   a booster provided within an engine room of a front side of the vehicle, for increasing a pedal depressing force;
   a hydraulic pressure master cylinder attached to a front portion of said booster by coupling a coupling flange of said hydraulic pressure master cylinder with a front surface plate of a booster shell of said booster, for receiving the pedal depressing force increased by said booster to operate a brake or a clutch by hydraulic pressure; and
   a reinforcement plate joined to an inside of said front surface plate of said booster shell, said reinforcement plate including a plate shaped portion and a reinforcement flange provided at an outer periphery of said plate shaped portion,
   wherein said reinforcement flange of said reinforcement plate is cut at a side opposite to a direction toward which said hydraulic pressure master cylinder is tilted by external force.

2. A hydraulic pressure generating apparatus for a vehicle according to claim 1, wherein said booster is provided at a surface of an engine room side of a dash panel which partitions between the engine room and a crew compartment continuing to the engine room.

3. A hydraulic pressure generating apparatus for a vehicle according to claim 2, wherein said dash panel is inclined to a direction toward which said hydraulic pressure master cylinder is tilted with respect to the longitudinal direction of the vehicle body by the external force, so that said booster and said hydraulic pressure master cylinder attached to said dash panel are integrally inclined.

4. A hydraulic pressure generating apparatus for a vehicle according to claim 1, wherein said reinforcement plate is cut at least in said reinforcement flange at a side of the direction toward which said hydraulic pressure master cylinder is tilted by the external force.

5. A hydraulic pressure generating apparatus for a vehicle according to claim 4, wherein said plate-shaped portion of said reinforcement plate is formed with a notched portion inwardly cut from an outer periphery of said reinforcement flange at said side of the direction toward which said hydraulic pressure master cylinder is tilted by the external force.

6. A hydraulic pressure generating apparatus for a vehicle according to claim 1, wherein said front surface plate of said booster shell includes a low strength portion at a side of the direction toward which said hydraulic pressure master cylinder is tilted by the external force, and said low strength portion is broken due to an abutment of said coupling flange thereto when said hydraulic pressure master cylinder is tilted by the external force applied thereto from a front direction of the vehicle body.

7. A hydraulic pressure generating apparatus for a vehicle according to claim 6, wherein said coupling flange of said hydraulic pressure master cylinder is formed in a substantially diamond shape with arc-shaped tip portions, said coupling flange is formed with a recessed portion at an outer surface of one of the arc-shaped tip portions to define a clearance between said coupling flange and said front surface plate of said booster shell, and when said booster and said hydraulic pressure master cylinder are connected, said arc-shaped tip portion provided with said recessed portion is arranged inside of said low strength portion in a radial direction of said booster shell.

8. A hydraulic pressure generation apparatus for a vehicle according to claim 6, wherein said reinforcement flange of said reinforcement plate is cut at said side of the direction toward which said hydraulic pressure master cylinder is tilted by the external force, said plate-shaped portion of said reinforcement plate is formed with a notched portion inwardly cut from an outer periphery of said reinforcement flange at said side of the direction which said hydraulic pressure master cylinder is tilted by the external force, and when said reinforcement plate is joined to said booster shell, an outer periphery of said notched portion is disposed inside of said low strength portion in the radial direction of said booster shell.

9. A hydraulic pressure generating apparatus for a vehicle according to claim 1, wherein said coupling flange of said hydraulic pressure master cylinder is formed in a substantially diamond shape with arc-shaped tip portions, and said coupling flange is formed with a recessed portion at an outer surface of one of said arc-shaped tip portions to define a clearance between said coupling flange and said front surface plate of said booster shell.

10. A hydraulic pressure generating apparatus for a vehicle according to claim 1, wherein said booster and said hydraulic pressure master cylinder are disposed so as to be inclined to the direction toward which said hydraulic pressure master cylinder is tilted with respect to a longitudinal direction of the vehicle body by the external force.

11. A hydraulic pressure generating apparatus for a vehicle, comprising:

a dash panel partitioning between an engine room of a front side of the vehicle and a crew compartment continuing to the engine room;

a booster protrusively provided at a surface of an engine room side of said dash panel, for increasing a pedal depressing force;

a hydraulic pressure master cylinder attached to a front portion of said booster by coupling a coupling flange of said hydraulic pressure master cylinder with a front surface plate of a booster shell of said booster, for receiving the pedal depressing force increased by said booster to operate a brake or a clutch by hydraulic pressure; and a reinforcement plate joined to an inside of said front surface plate of said booster shell, said reinforcement plate including a plate shaped portion and a reinforcement flange provided at an outer periphery of said plate shaped portion, wherein said booster and said hydraulic pressure master cylinder are disposed so as to be integrally inclined to one side with respect to a longitudinal direction of the vehicle body, and said reinforcement flange of said reinforcement plate is cut at a side opposite to said one side toward which said booster and said hydraulic pressure master cylinder are inclined.

12. A hydraulic pressure generating apparatus for a vehicle according to claim 11, wherein said reinforcement plate is cut at least in said reinforcement flange at said one side toward which said booster and said hydraulic pressure master cylinder are inclined.

13. A hydraulic pressure generating apparatus for a vehicle according to claim 12, wherein said plate-shaped portion of said reinforcement plate is formed with a notched portion inwardly cut from an outer periphery of said reinforcement flange at said one side toward which said booster and said hydraulic pressure master cylinder are inclined.

14. A hydraulic pressure generating apparatus for a vehicle according to claim 11, wherein said front surface plate of said booster shell includes a low strength portion at said one side toward which the booster and the hydraulic pressure master cylinder are inclined, and said low strength portion is broken due to an abutment of said coupling flange thereto when said booster and said hydraulic pressure master cylinder are inclined to a direction to be inclined by external force applied thereto from a front direction of the vehicle body.

15. A hydraulic pressure generating apparatus for a vehicle according to claim 14, wherein said coupling flange of said hydraulic pressure master cylinder is formed in a substantially diamond shape with arc-shaped tip portions, said coupling flange is formed with a recessed portion at an outer surface of one of the arc-shaped tip portions to define a clearance between said coupling flange and said front surface plate of said booster shell, and when said booster and said hydraulic pressure master cylinder are connected, said arc-shaped tip portion provided with said recessed portion is arranged inside of said low strength portion in a radial direction of said booster shell.

16. A hydraulic pressure generation apparatus for a vehicle according to claim 14, wherein said reinforcement flange of said reinforcement plate is cut at said one side toward which said booster and said hydraulic pressure master cylinder are inclined, said plate-shaped portion of said reinforcement plate is formed with a notched portion inwardly cut from an outer periphery of said reinforcement flange at said one side toward which said booster and said hydraulic pressure master cylinder are inclined, and when said reinforcement plate is joined to said booster shell, an outer periphery of said notched portion is disposed inside of said low strength portion in the radial direction of said booster shell.

17. A hydraulic pressure generating apparatus for a vehicle according to claim 11, wherein said coupling flange of said hydraulic pressure master cylinder is formed in a substantially diamond shape with arc-shaped tip portions, and said coupling flange is formed with a recessed portion at an outer surface of one of said arc-shaped tip portions to define a clearance between said coupling flange and said front surface plate of said booster shell.

18. A hydraulic pressure generating apparatus for a vehicle according to claim 11, wherein said dash panel is inclined with respect to the longitudinal direction of the vehicle body, so that said booster and said hydraulic pressure master cylinder attached to said dash panel are integrally inclined.

19. A hydraulic pressure generating apparatus for a vehicle, comprising:

a booster having a booster shell to be located at a surface of an engine room side of a dash panel and a valve housing continuous with said booster shell so as to protrude from said dash panel to a crew compartment side thereof;

a hydraulic pressure master cylinder attached to said booster, said hydraulic pressure master cylinder having a coupling flange coupling with a front surface plate of said booster shell, said coupling flange being formed in a substantially diamond shape with arc-shaped tip portions; and a reinforcement plate joined to an inside of said front surface plate of said booster shell, said reinforcement plate having a plate shaped portion and a reinforcement flange provided at an outer periphery of said plate shaped portion, wherein said front surface plate of said booster shell includes a low strength portion which has a shape similar to that of one of said arc-shaped tip portions, at one side of said front surface plate confronting with said arc-shaped tip portion, and said reinforcement flange of said reinforcement plate is cut at a side opposite to said one side of said front surface plate.

20. A hydraulic pressure generating apparatus for a vehicle according to claim 19, wherein said reinforcement flange of said reinforcement plate is cut at said one side of said front surface plate, said plate-shaped portion of said reinforcement plate is formed with a notched portion inwardly cut from an outer periphery of said reinforcement flange at said one side of said front surface plate.

21. A hydraulic pressure generating apparatus for a vehicle according to claim 20, wherein said booster and said hydraulic pressure master cylinder are assembled so that an outer periphery of said notched portion and said arc-shaped tip portion of said coupling flange are disposed inside of said low strength portion in a radial direction of said front surface plate.

22. A hydraulic pressure generating apparatus for a vehicle according to claim 19, wherein said coupling flange is formed with a recessed portion at an outer surface of said arc-shaped tip portion facing with said one side of said front surface plate to define a clearance between said coupling flange and said front surface plate of said booster shell.

* * * * *